United States Patent
Misiak et al.

(10) Patent No.: US 12,448,522 B2
(45) Date of Patent: Oct. 21, 2025

(54) METHOD FOR PREPARING AN AT LEAST PARTIALLY EXFOLIATED CLAY

(71) Applicant: Henkel AG & Co. KGaA, Duesseldorf (DE)

(72) Inventors: Hanns Misiak, Haan (DE); Ligang Zhao, Duesseldorf (DE); Hans-Georg Kinzelmann, Pulheim (DE); Sonja Amschler, Hollfeld (DE); Lina Mayr, Bayreuth (DE); Josef Breu, Bayreuth (DE); Andreas Edenharter, Waidhofen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 743 days.

(21) Appl. No.: 17/455,454

(22) Filed: Nov. 18, 2021

(65) Prior Publication Data
US 2022/0073751 A1 Mar. 10, 2022

Related U.S. Application Data

(63) Continuation of application No. PCT/EP2020/057722, filed on Mar. 20, 2020.

(30) Foreign Application Priority Data

May 20, 2019 (EP) ..................... 19175290

(51) Int. Cl.
*C09C 1/42* (2006.01)
*C08K 9/04* (2006.01)
(Continued)

(52) U.S. Cl.
CPC .................. *C09C 1/42* (2013.01); *C08K 9/04* (2013.01); *C09C 3/006* (2013.01); *C09C 3/04* (2013.01);
(Continued)

(58) Field of Classification Search
CPC .. C09C 1/42; C09C 3/006; C09C 3/04; C09C 3/10; C08K 9/04; C09J 11/04; C09J 11/08; C09J 175/04
See application file for complete search history.

(56) References Cited

U.S. PATENT DOCUMENTS

| 4,623,709 A | 11/1986 | Bauriedel |
| 5,849,830 A | 12/1998 | Tsipursky et al. |

(Continued)

FOREIGN PATENT DOCUMENTS

| CN | 101068748 A | 11/2007 |
| CN | 101506244 A | 8/2009 |

(Continued)

OTHER PUBLICATIONS

D. Kunz, J. Schmid, P. Feicht, J. Erath, A. Fery, J. Breu; ACS Nano, 7; No. 5 (2013) 4275-4280.

(Continued)

*Primary Examiner* — Jiangtian Xu
(74) *Attorney, Agent, or Firm* — Sun Hee Lehmann

(57) ABSTRACT

The invention relates to a method for preparing an at least partially exfoliated clay. The present invention further relates to an at least partially exfoliated clay obtainable by such a method and to a suspension comprising such a clay, as well to the use of such an at least partially exfoliated clay and of a suspension comprising such an at least partially exfoliated clay. Furthermore, the present invention is also directed to a polymeric composition comprising an at least partially exfoliated clay and/or a suspension comprising an at least partially exfoliated clay.

8 Claims, 4 Drawing Sheets

(51) Int. Cl.
    *C09C 3/00* (2006.01)
    *C09C 3/04* (2006.01)
    *C09C 3/10* (2006.01)
    *C09J 11/04* (2006.01)
    *C09J 11/08* (2006.01)
    *C09J 175/04* (2006.01)

(52) U.S. Cl.
    CPC ............... *C09C 3/10* (2013.01); *C09J 11/04* (2013.01); *C09J 11/08* (2013.01); *C09J 175/04* (2013.01)

(56) References Cited

U.S. PATENT DOCUMENTS

| | | |
|---|---|---|
| 6,420,466 B1 | 7/2002 | Haubennestel et al. |
| 6,515,164 B1 | 2/2003 | Bolte et al. |
| 6,794,445 B2 | 9/2004 | Reusmann et al. |
| 6,903,167 B2 | 6/2005 | Bolte et al. |
| 8,158,243 B2 | 4/2012 | Chan et al. |
| 10,920,042 B2 | 2/2021 | Misiak et al. |
| 2005/0020706 A1 | 1/2005 | Kollbach et al. |
| 2007/0129525 A1 | 6/2007 | Eichelmann et al. |
| 2007/0203250 A1* | 8/2007 | Hauser-Fuhlberg ............ C11D 3/1253 516/98 |
| 2008/0076832 A1 | 3/2008 | Winters et al. |
| 2008/0200600 A1* | 8/2008 | Schomaker ............ C08K 3/346 524/445 |

FOREIGN PATENT DOCUMENTS

| | | |
|---|---|---|
| CN | 102732034 A | 10/2012 |
| CN | 109563313 A | 4/2019 |
| EP | 0150444 A2 | 8/1985 |
| EP | 1048681 A2 | 11/2000 |
| EP | 0951493 B1 | 6/2001 |
| EP | 1456265 A1 | 9/2004 |
| EP | 1341832 B1 | 10/2016 |
| JP | H11193350 A | 7/1999 |
| WO | 2005097861 A1 | 10/2005 |
| WO | 2015010011 A1 | 1/2015 |
| WO | 2018033551 A1 | 2/2018 |

OTHER PUBLICATIONS

H. Kalo, M. W. Möller, D. A. Kunz, J. Breu; Nanoscale, 4 (2012) 5633-5639.

M. Stöter, D. A. Kunz, M. Schmid, D. Hirsemann, H. Kalo, B. Putz, J. Senker, J. Breu; J. Am. Chem. Soc., 29 (2013) 1280-1285.

H. Xia and M. Song, Polym Int 55:229-235 (2006).

Boulet et al., Combined experimental and theoretical investigations of clay polymer nanocomposites: intercalation of single bifunctional organiccompounds in Na1-montmorillonite and Na1-hectorite clays for the design of new materials, Journal of Materials Chemistry, vol. 13, 2003, pp. 2540-2550.

\* cited by examiner

METHOD FOR PREPARING AN AT LEAST PARTIALLY EXFOLIATED CLAY

The invention relates to a method for preparing an at least partially exfoliated phyllosilicate, e.g. a clay. The present invention further relates to an at least partially exfoliated clay obtainable by such a method and to a suspension comprising such a clay, as well to the use of such an at least partially exfoliated clay and of a suspension comprising such an at least partially exfoliated clay. Furthermore, the present invention is also directed to a polymeric composition comprising an at least partially exfoliated clay and/or a suspension comprising an at least partially exfoliated clay.

In polymeric compositions, such as sealants, coatings and adhesives, fillers are used in order to alter the physical properties of the respective formulation. A typical class of fillers are mineral compounds, such as silicates. In general, the aspect ratio (ratio of particle size in different dimensions, in particular ratio of the longest diameter to the shortest diameter; or often described as "aspect ratio" in case of platelet-type particles, being the fraction of the lateral diameter divided by the thickness) of filler particles is the key factor in improving the properties that fillers are imparting to a polymeric composition, which may encompass barrier functions against gases and/or fluids, and fire retardancy, as well as overall mechanical and thermal properties of the polymeric composition.

The efficiency of the gas barrier effect, with regard to the correlation between mineral assay and the barrier, steeply increases with the flatness of the particles (i.e. their aspect ratio), meaning that—at same mineral assays—increasing aspect ratios result in better gas barriers. With respect to gas barrier properties as well as overall dispersibility of the clay particles within a polymeric matrix, huge aspect ratios of several thousands are advantageous. The aspect ratios of laminated clay particles may be maximized by osmotic swelling. The osmotically swelled clay particles/layers are then delaminated or exfoliated from each other, which is different to the normal form in stacks.

Osmotic swelling occurs in aqueous suspensions and may be prompted/enhanced by, for instance, introduction of lithium cations, as thereby overall hydration of the clay particle surfaces is improved. The osmotic swelling of clay minerals results in exfoliated clay particles with comparably huge aspect ratios.

The osmotic swelling usually requires several steps like treatment with special chemicals and in addition exposure to high shear forces (e.g. stirring at very high frequency), or in case of synthetic hectorite initial treatment with water. The subsequent transfer of the mixture of the exfoliated clay such as synthetic hectorite) and water into either other aqueous or organic formulations has so-far required surface-modification.

For example, in below literatures, the exfoliated clay first treated with water was then treated with quarternized ammonium species to achieve the surface modification.
D. Kunz, J. Schmid, P. Feicht, J. Erath, A. Fery, J. Breu; ACS Nano, 7; No. 5 (2013) 4275-4280;
H. Kalo, M. W. Möller, D. A. Kunz, J. Breu; Nanoscale, 4 (2012) 5633-5639;
M. Stöter, D. A. Kunz, M. Schmid, D. Hirsemann, H. Kalo, B. Putz, J. Senker, J. Breu;
J. Am. Chem. Soc., 29 (2013) 1280-1285; and
WO 2018/033551 A1

Such a surface modification treatment is also required to involve further steps like mixing with solvents or centrifuging, sieving etc. to transfer the exfoliated clay from aqueous medium into a solvent-based medium. Only after the medium transfer, the exfoliated clay in solvent-based medium can be applied in the solvent-based polymeric compositions, such as solvent-based adhesives for example, if a significant amount of water is contained in filler used in a solvent-based polyurethane adhesive composition, the isocyanate component will react with water, rendering a brittle mass, lacking any capability of adhering to surfaces as well as showing foam generation due to $CO_2$-generation.

In addition, H. Xia and M. Song, Polym Int 55:229-235 (2006) discloses to exfoliate the clay layers by direct mixing in a tri-hydroxyl branched polyether polyol. However, the method requires the mixing of the clay and specific polyether polyol at a higher temperature for a relative long time.

Therefore, it is an object of the present invention to provide alternative exfoliating agent for the osmotic swelling/exfoliation of various minerals, in particular laminated clay minerals, such as phyllosilicates, in particular of the hectorite-type, which allow for a direct and easy preparation of suspensions of said modified minerals in non-aqueous medium. In other words, instead of exfoliating the hectorite in water and subsequently conducting the transfer into organic matrix (e.g. solvent-based formulation), the hectorite can directly be exfoliated in the organic medium.

In this regard, it has been surprisingly found by the inventors that the use of an exfoliating agent comprising a partial ester of poly(alkylene oxide) (meth)acrylate, a cyclic carbonate and a very small amount of water, allows for at least partially exfoliated or even complete exfoliation of the mineral. The resulting suspensions of exfoliated clays/minerals may be directly used as additives for adhesive, sealant and coating compositions, which then exhibit improved gas barrier properties.

Figure 1:
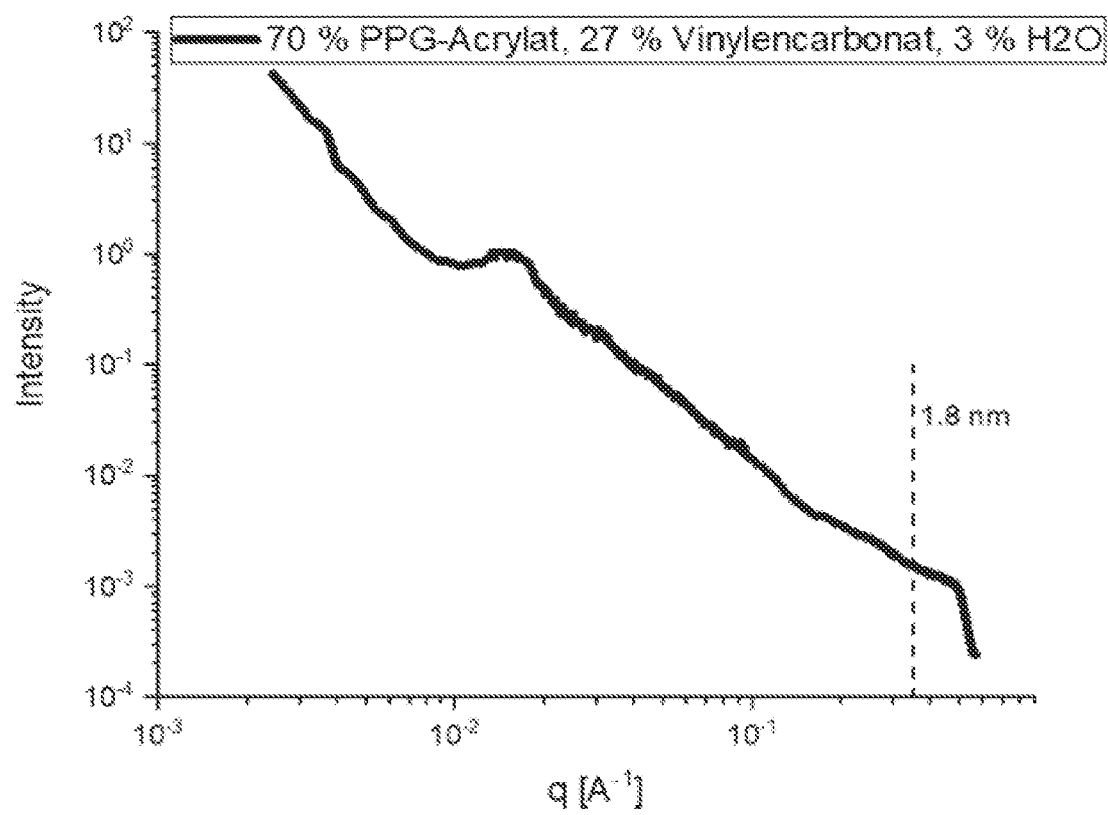
FIG. 1 shows the results of SAXS (Small Angle X-ray Scattering) measurement on the sample based on Example 4.

In a first aspect, the present invention thus relates to a method for preparing an at least partially exfoliated clay, comprising the steps of:
 (1) providing a clay;
 (2) providing an exfoliating agent, comprising a partial ester of poly(alkylene oxide) (meth)acrylate, a cyclic carbonate and water, wherein the water is present in an amount of 10% by volume or less based on the volume of the exfoliating agent;
 (3) mixing the clay and the exfoliating agent; and
 (4) obtaining the at least partially exfoliated clay.

In a further aspect, the present invention relates to an at least partially exfoliated clay obtainable by a method of preparation as described herein.

In another aspect, the present invention relates to a suspension comprising the at least partially exfoliated clay as described herein.

In yet another aspect, the present invention further relates to the use of an at least partially exfoliated clay as disclosed herein.

In a still further aspect, the present invention relates to the use of a suspension comprising the at least partially exfoliated clay as described herein.

Finally, the present invention also relates to a polymeric composition comprising an at least partially exfoliated clay as described herein and/or a suspension comprising the at least partially exfoliated clay as described herein.

Further preferred embodiments of the invention are set out in the claims.

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

If reference is made herein to a molecular weight of a polymer or its components, this reference refers to the average number molecular weight $M_n$, if not explicitly stated otherwise. The number average molecular weight $M_n$ can be calculated based on end group analysis (OH numbers according to DIN 53240) or can be determined by gel permeation chromatography according to DIN 55672-1:2007-08 with THF as the eluent. If not stated otherwise, all given molecular weights are those determined by end group analysis. The weight average molecular weight $M_w$ can be determined by GPC, as described for $M_n$.

All percentages given herein in relation to the compositions or formulations relate to weight % relative to the total weight of the respective composition or formula, if not explicitly stated otherwise.

The method for preparing at least partially exfoliated clay according to the present invention comprises the following steps:

In a first step, there is provided a clay. In the context of the present invention, any clay, which is characterized by a laminated mineral structure, may be osmotic swelling and exfoliated in a method as disclosed herein. In various embodiments, the clay is an osmotically swellable clay. In various embodiments, the clay is a natural or synthetic layered silicate mineral. For instance, the clay may be a phyllosilicate. In various embodiments, the clay is preferably selected from the group consisting of smectite, montmorillonite, saponite, beidellite, montmorillonite, hectorite, stevensite, vermiculite, kaolinite, hallosite, magadiite, and fluorohectorite. The clay may contain cations naturally occurring within the molecular lattice of the clay, such as $Ca^{2+}$, $K^+$, $Na^+$ or $Li^+$. Such clays or pristine clays are commercial products widely available on the market. Alternatively, they can be synthesized by the method described for example in Stöter, M.; Kunz, D. A.; Schmidt, M.; Hirsemann, D.; Kalo, H.; Putz, B.; Senker, J.; Breu, J. Nanoplatelets of Sodium Hectorite Showing Aspect Ratios of 20000 and Superior Purity. Langmuir 2013, 29, 1280-1285.

In various embodiments, the clay provided in the first step of the method according to the present invention is a phyllosilicate.

In various embodiments, the clay provided in the first step of the method according to the present invention preferably is hectorite.

In a second step, at least one exfoliating agent is provided. The term "exfoliating agent", as used herein, refers to a mixture of compounds, which will render the clay such as hectorite to osmotic swell, and 1 nm-thick layers of clay are dispersed in the matrix forming a composite structure on the microscale. Thereby, the osmotic swelling and exfoliation of the clay is depending upon the chemical characteristics of the exfoliating agent. In the context of the present invention, the structure of the clay modifying agents is selected purposefully, such that an at least partially exfoliated clay may be obtained using the compounds as disclosed herein.

According to the present invention, the exfoliating agent comprises a partial ester of poly(alkylene oxide) (meth)acrylate, a cyclic carbonate and a very small quantity of water. The water, preferably demineralized water, is present in an amount of 10% by volume or less, preferably 0.5% to 10% by volume, more preferably 0.1% to 5% by volume, and even more preferably 0.5% to 3% by volume based on the volume of the exfoliating agent. Therefore, water does not play an important role, neither with regard to the swelling and exfoliation of the clay, nor with regard to the characteristics of the matrix the clay is contained, e.g. polarity and chemical properties, in the context of the present invention. The exfoliating agent as described in this invention can have functional groups such as hydroxy and/or thiol groups that allow their reaction with cross-linker and are built into the macromolecular network, forming upon hardening.

Surprisingly, the inventors have found that an excellent exfoliation of clay can be achieved by using such a combination of organic compounds and small amount of water.

The partial ester of poly(alkylene oxide) (meth)acrylate may be represented by:

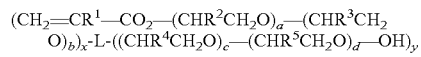

wherein $R^1$ is hydrogen or methyl, $R^2$ to $R^5$ are each independently hydrogen or $C_{1-6}$ alkyl, and preferably are each independently hydrogen, methyl or ethyl, L is single bond or w valent linking group selected from linear or branched chain $C_{1-12}$ alkylene, $C_{3-12}$ cyclic alkylene, phenylene, residue of a $C_{1-12}$ polyol, optionally substituted by a reactive group, e.g. hydroxy, thiol, epoxy, vinyl or (meth)acrylic ester group, and preferably is single bond or pentaerythritol residue, x is from 1 to 5, preferably from 1 to 3, y is from 1 to 5, preferably from 1 to 3, w is from 2 to 6, preferably from 2 to 4, a and b are each independently 1 to 50, preferably 1 to 30, and c and d are each independently 0 to 50, preferably 0 to 30, with the proviso that when L is single bond, x and y are 1, and when L is the w valent linking group, w is the sum of x and y.

According to the present invention, the partial ester of poly(alkylene oxide) (meth)acrylate contains at least one terminal hydroxy group, and preferably one or two terminal hydroxy groups.

In various embodiments, the partial ester of poly(alkylene oxide) (meth)acrylate selected from poly(alkylene oxide) mono(meth)acrylate, pentaerythritol poly(alkylene oxide) (meth)acrylate, and combination thereof, preferably is selected from poly(ethylene oxide) mono(meth)acrylate, poly(propylene oxide) mono(meth)acrylate, pentaerythritol poly(ethylene oxide) di(meth)acrylate, and combination thereof.

In certain embodiments, the partial ester of poly(alkylene oxide) (meth)acrylate has a number average molecular weight from 150 to 3,000, preferably from 200 to 2,000.

The partial ester of poly(alkylene oxide) (meth)acrylate in the present invention are commercially available or can be prepared by the method well known in the art.

Examples of the partial ester of poly(alkylene oxide) (meth)acrylate are poly(ethylene glycol) monomethacrylate having a Mn of 360, poly(propylene glycol) monoacrylate having a Mn of 475, and poly(propylene glycol) monoacrylate having a Mn of 375 all from Sigma-Aldrich.

According to the present invention, the partial ester of poly(alkylene oxide) (meth)acrylate is present in amount of 30 to 90%, preferably 50% to 85% by volume based on the volume of the exfoliating agent.

The cyclic carbonate suitable for the present invention is selected from the following compound, the dimer thereof, and the combination thereof.

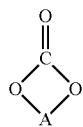

(I)

In Formula (I), A may be represented by $(C(R^6R^7))_p$, wherein p is of 2 or more, preferably is 2 or 3, particularly preferably is 2, $R^6$ and $R^7$, each independently is hydrogen atom, a saturated or unsaturated, straight-chain or branched chain or cyclic, aromatic or arylaliphatic, optionally substituted hydrocarbon group with 1 to 12 carbon atoms, or ether group with 1 to 12 carbon atoms and up to 3 oxygen atoms. A may be represented by $R^8X$, wherein $R^8$ is a divalent aliphatic, cycloaliphatic, aromatic, arylaliphatic or ether-containing optionally substituted hydrocarbon group with 1 to 20 carbon atoms and X is hydroxy-, epoxy, carboxylic acid-, carboxylic acid ester group. Or A may be represented by Z, wherein Z is an unsaturated polymerizable group, preferably a vinyl-, (meth)acrylic-, maleic acid-, fumaric acid-, itaconic acid- or crotonic acid-ester-group.

The cyclic carbonate may have a number average molecule weight from 50 to 1,000, and preferably from 50 to 500.

In certain embodiments, the cyclic carbonate is selected from the group consisting of vinylene carbonate, ethylene carbonate, propylene carbonate, glycerol carbonate, 5-ethyl-5-(hydroxymethyl)-1,3-dioxane-2-one, 1,3-dioxane-2-one, 5-((allyloxy)methyl)-5-ethyl-1,3-dioxane-2-one, 1,3-dioxepine-2-one and combination thereof, and more preferably is selected from vinylene carbonate, glycerol carbonate, and combination thereof.

The partial ester of poly(alkylene oxide) (meth)acrylate in the present invention are commercially available or can be prepared by the method well known in the art.

According to the present invention, the cyclic carbonate is present in amount of 5 to 60%, preferably 10% to 50% by volume based on the volume of the exfoliating agent.

In one embodiment, the exfoliating agent comprises 30 to 90%, preferably 50% to 85% by volume of partial ester of poly(alkylene oxide) (meth)acrylate, 5 to 60%, preferably 10% to 50% by volume of cyclic carbonate, and 0.1% to 10% by volume, and preferably 0.5% to 5% by volume of water, in which the percentages are based on the volume of the exfoliating agent.

In various embodiments, the exfoliating agent optionally comprises one or more additives in the exfoliating agent so long as the advantages of the present invention will not be deteriorated. Examples of such additive are ketone, lactone, lactam, nitrile, nitro compound, carboxamide, urea compound, sulfoxide, sulfone, ether, alcohol, primary or secondary amine, carboxylic acid, or primary or secondary amide type. The additive may be present in amount of 0 to 10% by volume, preferably 0% to 5% by volume based on the volume of the exfoliating agent.

In order to obtain an at least partially exfoliated clay, in a third step of the method according to the present invention, the clay as described above and the exfoliating agent as described above are mixed together. The two components are mixed with each other in the non-aqueous suspension over a period of time sufficient for the clay to become swelling by the exfoliating agent and exfoliated/dispersed in the exfoliating agent. In various embodiments, the mixing of the clay and the exfoliating agent is performed by additional gentle agitation or stirring. In various embodiments, the mixing of the clay and the exfoliating agent is performed over a period of 1 to 48 hours, preferably 4 to 24 hours.

The clay provided in the third step of the method according to the present invention is provided in the form of a non-aqueous suspension, wherein the clay may be either partially or completely exfoliated in the matrix of exfoliating agent. Preferably, the clay is an at least partially exfoliated clay. The term "at least partially exfoliated clay", as used herein, generally refers to a clay, in which the mineral layers or tactoids have been completely or partially separated from one another, i.e. intercalation of the molecules of exfoliating agent and thereby at least partial exfoliation of the tactoids has occurred.

Methods for the preparation of non-aqueous suspensions of clay as described herein, wherein the clay may be either partially or completely exfoliated, are known in the art. For instance, non-aqueous clay suspensions may be prepared by subjecting the non-aqueous clay mixture to shearing forces such as by mechanical mixing to partially and/or fully exfoliate the clay. These methods include, but are not limited to, ultrasonication, megasonication, grinding/milling, high speed blending, homogenization, and the like. Although such high shearing methods may be used in the process of the present invention, these methods are not required to achieve the exfoliation state as it is spontaneous after the clay is mixed with the exfoliating agent. It may be a benefit for the method according to the present invention since high shear forces and shock waves, as they occur in case of e.g. Ultra Turrax-stirrers or ultrasonication also bear the potential of penetrating (formation of punctures) or disintegrating the mineral platelets, which would be a detrimental effect. In the various embodiments of this invention, the clay may include both exfoliated clay layers and non-exfoliated clay particles. In certain embodiments of the present invention, homogenization of the non-aqueous clay suspension is not required.

In the various embodiments of this invention, the clay and the exfoliating agent are mixed in the third step of the method at a temperature from 20° C. to 60° C., and preferably from 20° C. to 40° C., and more preferably at room temperature.

In the various embodiments of this invention, the clay and the exfoliating agent are mixed in the third step of the method for 30 min to 6 hours, preferably 30 min to 4 hours, and more preferably 1 hour to 2 hours.

In the various embodiments of this invention, the at least partially exfoliated clay obtained in the third step comprise no more than 50%, preferably no more than 20%, and more preferably no more than 10%, and even more preferably no more than 5%, and in particular no non-exfoliated clay particles, based on the total of exfoliated clay layers and non-exfoliated clay particles, as measured by Small Angle X-ray Scattering method in the Example Section.

In various embodiments, the method according to the present invention does not comprise a step of treating the clay with water, surface modifying the clay, and/or transferring the clay to another solvent system. Therefore, the method according to the present invention readily transfer a clay from a crude form to be partially or fully exfoliated in an organic matrix in a single transfer step.

In a further aspect, the present invention relates to an at least partially exfoliated clay obtainable by a method of preparation as described above.

In yet another aspect, the present invention further relates to a suspension comprising the at least partially exfoliated clay and the exfoliated agent, as described herein.

According to certain embodiments, the at least one solvent is selected from the group consisting of methanol, ethanol, acetone, butanone, ethyl acetate, and acetonitrile, preferably ethanol, acetone, butanone, and ethyl acetate. In certain other embodiments, the at least one solvent is selected from the group consisting of acetonitrile, acetone, butanone, ethanol, dioxane, and ethyl acetate. In various other embodiments, the at least one solvent is selected from the group consisting of acetone, butanone, ethanol, dioxane, and ethyl acetate.

The present invention is further directed to the use of an at least partially exfoliated clay as described herein.

In various embodiments, the at least partially exfoliated clay as described herein is used for the preparation of a polymeric composition.

The exfoliation of the clay in a method as described herein allows for transfer of exfoliated clay particles into a polymeric matrix in one transfer step. Greater exfoliation of at least partially exfoliated clays in polymer matrices generally leads to more enhanced properties, such as mechanic properties (e.g. tensile moduli, moduli of rupture), thermal properties (e.g. thermal conductivity), and isolating properties (e.g. gas barrier properties). For this reason, the at least partially exfoliated clay according to the present invention is highly useful in the preparation of technically advantageous and superior polymeric compositions for various fields of application.

Further, the clay at least partially exfoliated according to this invention can then be used directly, or for modification of other formulations. For instance, the clay could come up as a kind of masterbatch formulation, that could be added to other formulations in order to tune their properties such as gas barrier performance.

According to certain embodiments, the polymeric composition is selected from the group consisting of a coating composition, a sealant composition, and an adhesive composition.

In various embodiments, the transfer of the at least partially exfoliated clay particles into a polymeric matrix encompasses the provision of a suspension comprising the at least partially exfoliated clay according to the present invention, whereby said suspension comprising the at least partially exfoliated clay is transferred into a polymeric matrix.

The present invention is thus further directed to the use of a suspension comprising the at least partially exfoliated clay as described herein.

In various embodiments, the suspension comprising the at least partially exfoliated clay as described herein is used for the preparation of a polymeric composition. According to certain embodiments, the polymeric composition is selected from the group consisting of a coating composition, a sealant composition, and an adhesive composition.

Furthermore, the present invention is directed to a polymeric composition comprising an at least partially exfoliated clay as described herein and/or a suspension comprising the at least partially exfoliated clay as described herein.

According to certain embodiments, the polymeric composition is selected from the group consisting of a coating composition, a sealant composition, and an adhesive composition.

In various other embodiments, the at least partially exfoliated clay is present in an amount of 0.1 to 25% by mass, preferably 1 to 10% by mass, based on the total weight of the solid content of the polymeric composition.

In preferred embodiments, the at least partially exfoliated clays or suspensions of the at least partially exfoliated clays as described herein may be used as additive components for adhesive compositions, in particular polyurethane adhesive compositions. The at least partially exfoliated clays as described herein may be used as additive components for one component (1-c) or two component (2-c) polyurethane adhesive compositions. Especially preferred polyurethane (PU) adhesive compositions may be 2-c adhesive compositions. These 2-c polyurethane adhesive compositions generally comprise a component (a) and a component (b), wherein the component (a) is a resin component and the component (b) is a curing agent, respectively cross-linker, component.

In separated form, the two components (a) and (b) are storage-stable.

In certain embodiments, the resin component (a) comprises at least one polyol and/or at least one NCO-reactive prepolymer, and the curing agent component (b) comprises at least one polyisocyanate. In certain other embodiments, however, the resin component (a) comprises at least one NCO-terminated prepolymer, and the curing agent component (b) comprises at least one polyol and/or another compound with at least two NCO-reactive groups. Generally, the latter is preferred.

In such systems, the at least partially exfoliated clay according to the present invention may be comprised in the curing agent component or the resin component. In preferred embodiments, the at least partially exfoliated clay may be comprised in the curing agent component.

In each of the components, additional additives can be incorporated provided they do not react with the reactive groups of the other compounds during storage so as to ensure stability of the formulation.

In preferred embodiments according to the present invention, the resin component (a) comprises at least one NCO-terminated prepolymer.

Suitable NCO-terminated prepolymers may be prepared by reacting at least one polyol or at least one polyol mixture with at least one polyisocyanate, wherein the at least one polyisocyanate is used in molar excess.

The at least one polyol to be employed in the preparation of the NCO-terminated prepolymer can be selected form a broad range of commercially available products, e.g. polyetherpolyols, polyesterpolyols, oleochemical polyols, aliphatic, cycloaliphatic or aromatic polyols, OH-group containing polymeric or oligomeric compounds like polycarbonates, polybutadienes, polyacrylates or mixtures thereof.

One group of suitable polyols are polyester polyols, which can be prepared by condensation of di- or tricarboxylic acids with an excess of bi- or trifunctional alcohols. The carboxylic acids may be aliphatic, cycloaliphatic, aromatic or heterocyclic or mixtures thereof. Examples of suitable acids are aliphatic acids, like adipic acid, sebacic acid, glutaric acid, azelaic acid, suberic acid, undecanedioic acid, dodecandioic acid, 3,3-dimethylglutaric acid, hexahydrophthalic acid; aromatic acids like phthalic acid, terephthalic acid, isophthalic acid; unsaturated acids like maleic acid, fumaric acid, dimer fatty acid; tricarboxylic acids like citric acid and trimellitic acid. Examples of suitable bi- or trifunctional alcohols include, without limitation, low molecular weight alcohols like ethylene glycol, diethylene glycol, neopentyl glycol, hexanediol, butanediol, propylene glycol, glycerol or trimethylol propane, dipropylene glycol, 1,4-butanediol, 1,6-hexanediol, 1,8-octanediol, 1,10-dicanediol, 1,12-dodecanediol, 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol, as well as glycerol, trimethylolpropane, or mixtures of the aforementioned.

Another group of suitable polyester polyols are based on ε-caprolactone, also called polycaprolactones, or on hydroxycarboxylic acids, for example ω-hydroxycaproic acid. Such polyols contain at least two OH groups, preferably terminal OH groups or polymers of tetrahydrofurane (THF).

Another group of polyester polyols, which are useful in the invention, are the so called oleochemical polyols. Such polyester polyols can be prepared, for example, by complete ring-opening of epoxidized triglycerides of a fat mixture, which comprises at least partly olefinically unsaturated fatty acids with one or more alcohols having 1 to 12 alcohols, and subsequent partial transesterification of the triglyceride derivatives to give alkyl ester polyols having 1 to 12 C atoms in the alkyl radical. Another group of such preferably suitable polyols based on natural products are dimer diols, as well as castor oil and derivatives thereof.

Another group of polyols are polyacetals. Polyacetals are understood to be compounds obtainable by reacting glycols, for example diethylene glycol or hexanediol or mixtures thereof, with formaldehyde. Polyacetals suitable for the purposes of the invention may also be obtained by polymerizing cyclic acetals. Another group of polyols are polycarbonates. Polycarbonates may be obtained, for example, by reacting diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene.

Also suitable for use in the invention are hydroxyfunctional polybutadienes, known by the commercial name of Poly-bd®.

Polycarbonate polyols may be prepared by reacting diols, such as propylene glycol, 1,4-butanediol, or 1,6-hexanediol, diethylene glycol, triethylene glycol, or tetraethyleneglycol, or mixtures thereof with diaryl carbonates, for instance diphenyl carbonates, or phosgene.

Other suitable polyol components are polyether polyols, which are the reaction products of low molecular weight polyhydric alcohols with alkylene oxides. The alkylene oxides preferably contain 2 to 4 carbon atoms. Suitable reaction products of the type in question are, for example, the reaction products of ethylene glycol, propylene glycol, the isomeric butane diols, hexane diols or 4,4'-dihydroxydiphenyl propane with ethylene oxide, propylene oxide or butylene oxide or mixtures of two or more thereof. The reaction products of polyhydric alcohols, such as glycerol, trimethylol ethane or trimethylol propane, pentaerythritol or sugar alcohols or mixtures of two or more thereof, with the alkylene oxides mentioned to form polyether polyols are also suitable. Such polyether polyols are available in different molecular weight, as compositions, as homopolymers or statistical or block copolymer. Another group of polyether polyols are polytetramethylenglycoles, which can be prepared by polymerization of tetrahydrofuran.

Also suitable are polyetherglycols with a low molecular weight of less than 500 g/mol (number average molecular weight $M_n$).

Other examples of low molecular weight polyols include low molecular weight diols and triols, for instance $C_2$ to $C_{20}$ diols, like ethylene glycol, propylene glycol, 1,2- or 1,4-butanediol, 1,5-petanediol, 1,6-hexanediol, 1,8-octanediol, 1,12-dodecandiol, dimeric fatty acid alcohols or higher homolougous diols or their isomers. Additionally, polyols with 3 or more functional groups can be used, like glycerol, trimethylol ethane (TME), pentaerythrite and/or trimethylol propane (TMP), or higher functional alcohols like oligomers of pentaerythrite, or TMP or TME, or di-glycerol, triglycerol, or sugar alcohols.

The composition may further comprise polyols that are hydroxy-functionalized polymers, for example hydroxy-functionalized siloxanes. Exemplary siloxanes that may be used are hydroxy-functionalized polydimethylsiloxanes, in particular in liquid form, such as those commercially available under the name Telomer® H-Si 2311 (Evonik, Germany) having a number average molecular weight $M_n$ of about 2,200 g/mol. Suitable polydimethylsiloxane (PDMS) polyols are, for example, described in U.S. Pat. No. 6,794,445 B2. They may be used in amounts of up to 60 wt.-% based on the total weight of the polyols used and typically have low $T_g$ values, for example in the range of from $-150$ to $-100°$ C.

The number average molecular weight $M_n$ of the polyols employed in the synthesis of the NCO-terminated prepolymer preferably is within the range of 320 to 20,000 g/mol, in particular 330 to 4500 g/mol. The nominal functionality may be in the range of 2 to 4.5. Preferably, the PU prepolymer has a polyether/polyester backbone.

For the preparation of the resin component (a), one or more of the aforementioned polyols may be reacted with at least one polyisocyanate in order to form the NCO-terminated prepolymer. The at least one polyisocyanate is used in molar excess relative to the hydroxyl groups of all polyols present in the reaction mixture. In certain embodiments, the NCO:OH ratio of the NCO-reactive polyurethane prepolymer is not necessarily but preferably 1:1 to 1.8:1, preferably 1:1 to 1.6:1, in particular 1.05:1 to 1.5:1.

Suitable polyisocyanates to be used for the preparation of the NCO-terminated prepolymer are known the art and may include monomeric isocyanates, which contain two or three NCO groups. For instance, they include well-known aliphatic, cyclo-aliphatic or aromatic monomeric diisocyanates. Preferably, isocyanates are selected with a molecular weight from 160 g/mol to 500 g/mol, for example aromatic polyisocyanates, for example the isomers of diphenylmethanediisocyanate (MDI), such as 4,4'-diphenylmethanediisocyanate (4,4'-MDI), 2,2'-diphenylmethane diisocyanate (2,2'-MDI), 2,4'-diphenylmethanediisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODI), toluene diisocyanate, naphthalene, di- and tetraalkyl diphenylmethane diisocyanate, 4,4'-dibenzyl diisocyanate, and combinations thereof.

Aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-1,3-cyclohexane or 1,4-dodecane, 4,4'-dicyclohexylmethanediisocyanate, cyclohexane diisocyanate, 1-methyl-2,4-diisocyanato-cyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partially hydrogenated), or the trimer of HDI, or the dimeric or trimeric toluene-diisocyanate, and combinations thereof can also be used.

It is also possible to include at least partly oligomeric diisocyanates such as allophanate, carbodiimide, isocyanurate, biuret condensation products from diisocyanates, e.g., from HDI, MDI, IPDI or other isocyanates. Polymeric MDI can also be employed. Mixtures of aliphatic or aromatic isocyanates can be used. More preferably aromatic diisocyanates may be used.

In certain embodiments, the at least one NCO-terminated prepolymer of the resin component (a) has a number average molecular weight $M_n$ in the range of 1,500 to 100,000, preferably 2,000 to 50,000 g/mol. Typically, the resulting prepolymers have a NCO-content of 5-20 wt.-%, and a nominal average functionality of 2 to 3.

Examples of suitable NCO-terminated prepolymers are disclosed in EP-A951493, EP-A1341832, EP-A150444, EP-A1456265, and WO2005/097861.

Further, the adhesive composition according to the present invention comprises a curing agent component (b). Suitable curing agent components are known in the art. In the case of an NCO-terminated prepolymer based resin component, typically polyol compounds are employed in the curing agent component. According to preferred embodiments of the present invention, the curing agent component (b) comprises at least one polyol. The polyols may be selected from those that have been disclosed in connection with the prepolymers above.

Generally, while the above has been disclosed by reference to NCO-terminated prepolymers, it is understood that by changing the molar ratios of the described reactants in the prepolymer synthesis, OH-terminated prepolymers can be generated. Accordingly, in such embodiments, the same compounds described above may be used. In still further embodiments, the polyols disclosed above may be used as such or in combination with OH-terminated prepolymers as the resin component. The curing agent would then in both cases comprise polyisocyanates.

In addition, the adhesive according to the invention may contain other auxiliary materials, which are preferably admixed wholly or partially with the resin component. Auxiliaries are substances, which are generally added in small quantities in order to modify the properties of the adhesive in a desired direction, for example viscosity, wetting behavior, stability, rate of reaction, or storage life. Such additives for the improvement of special properties are for example antifoam agents, wetting agents or surfactants, like stearates, silicone oil and addition products of ethylene oxide or propylene oxide with fatty alcohols; UV stabilizers antioxidants, like sterically hindered phenols, thioethers, substituted benzotriazoles or from the HALS type; additional adhesion promoters, for example silanes containing hydrolysable groups like hydroxy functional, (meth)acryloxy functional, amino functional or epoxyfunctional trialkoxysilanes, including methoxy, ethoxy, propoxy or butoxy groups; and fire retardants.

To increase the reactivity of the adhesive for crosslinking, the adhesive may optionally contain catalysts. Suitable catalysts, which can be employed according to the invention are, in particular, the organometal and/or aminic catalysts. Examples include titanates like tetrabutyl titanate or tetrapropyl titanate, dibutyl tin dilaulate (DBTL), dibutyl tin diacetate, tin octoate, dibutyl tin oxide, chelated metals, like Zr-acetylacetonate, Ti-acetylacetonate, Fe-acetylacetonate, amino compounds like triethylenetetramine, triethylenediamine diethylaminopropylamine, morpholin, N-methylmorpholin, 1,8-diazabicyclo-[5,4,0]-undecene-7 (DBU), cyclohexylamine, 2-ethyl-4-methylimidazole. Catalysts are incorporated preferably in the curing agent component.

Another group of additives are tackifying resins. Resins are known in different composition and types as synthetic resin or as natural resin. Examples for such resins are abietic acid, abietic acid esters, terpene resins, terpene/phenol resins, poly-α-methylstyrene or aliphatic, aromatic or aromatic/aliphatic hydrocarbon resins or coumarone/indene resins.

Optionally, the adhesive may contain pigments or fillers. Such additives can be used to modify specific properties of the adhesive. Examples are oxides, silicates, sulfates, phosphates or carbonates of Ti, Zr, Al, Fe, Mg, Ca, Ba or Zn, such as natural, ground chalk, precipitated chalk, barytes, talcum, mica, carbon black, titanium dioxide, iron oxides, aluminum oxide, zinc oxide, zinc sulfate or silicon dioxide. Water-absorbing powders, for example zeolite, may also be present as a filler. The fillers should be present in finely divided form, for example of 1 to 200 µm, in particular up to 50 µm, in size, but they may also be nano-scale pigments.

The composition may further contain silicon dioxide. Examples include treated silicas, precipitated silica, untreated silica especially pyrogenic silica or fumed silica is useful.

The composition may further include additional polymers containing a plurality of carboxylic acid groups and/or hydroxyl groups. As this compound can react with isocyanates it is typically included in the curing agent component (b). Such components can be selected for examples from polycarboxylic polyhydroxy acid amides, polycarboxylic acid amides, and modified polyhydroxy ureas. Such polymers are known as physically thixotropy agents and are commercially available. They are disclosed for examples in U.S. Pat. No. 6,420,466 or EP1048681.

In principle, the different additives and auxiliaries can be included in each of the components. But it is useful to select such additives, which do not react with the other compounds of component (a) or (b). In specific embodiments, the catalyst is added in component (b).

Methods for the preparation of both the resin component (a) and the curing agent component (b) are known in the art. The two components are stored separately until use. For use, the resin and the curing agent components are mixed together in a manner known per se. After mixing of the resin component (a) with the curing agent component (b), the ratio of the isocyanate groups present in the adhesive composition to the OH groups present in the adhesive composition is generally in the range of equivalence, it being convenient to provide a slight excess of isocyanate groups with regard to moisture present on the surface. The NCO/OH ratio should amount to between 0.90:1 and 1.5:1, in particular 1.0:1 to 1.3:1.

The polyurethane adhesives of the invention are liquid at application temperatures. It is preferred that the polyurethane adhesives of the invention are liquid at room temperature. In various embodiments, the adhesive compositions according to the present invention have a viscosity of 500 to 100,000, especially 1,000 to 20,000 mPas at a temperature of 40° C., as determined according to DIN ISO 2555 (Brookfield viscometer RVT, spindle No. 4, 25° C.; 5 rpm). The adhesives described herein may contain one or more solvents or may be solvent-free. Suitable solvents known to those skilled in the art, in particular, esters, ketones, halogenated hydrocarbons, alkanes, alkenes and aromatic hydrocarbons. Particular examples of suitable solvents are methylene chloride, trichlorethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, acetone, methyl ethyl ketone, dioxane, ethyl acetate, ethylene glycol monobutyl ether, ethylene glycol monoethyl, 2-ethylhexyl acetate, glycol diacetate, heptane, hexane, isobutyl acetate, isooctane, isopropyl acetate, methyl ethyl ketone, tetrahydrofuran or tetrachlorethylene, or mixtures of two or more of the solvents mentioned. In preferred embodiments, the polyurethane adhesive composition according to the present invention is free of solvents.

The adhesives can be applied to the substrate by all known techniques, including without limitation, spraying, painting, dip-coating, spin-coating, printing and the like.

Thus, another embodiment of the invention is method of use of the polyurethane adhesive composition according to the present invention. In various embodiments, such a method encompasses a process of applying the adhesive composition to the surface of a substrate, whereby the adhesive is polyurethane adhesive composition as described above. In the process according to the invention, the two components (a) and (b) of the adhesive are mixed immediately before application. The adhesive composition is subsequently applied to the surface of the substrate.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

Example Section

Materials:

Vinylene carbonate is available from Sigma-Aldrich.
Glycerol carbonate is available from Huntsman.
Jeffamine M-600 is the trade name of polyether amine having following structure available from Huntsman.

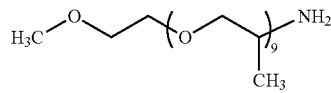

Jeffamine M-2070 is the trade name of polyether amine based on polyethylene oxide and polypropylene oxide available from Huntsman.
PPG-triol is a propoxylated glycerol under the trade name of Voranol CP 450 available from Dow.
PEG-MA is a poly(ethylene glycol) monomethacrylate having a Mn of 360 available from Sigma-Aldrich.
PPG-A is poly(propylene glycol) monoacrylate having a Mn of 475 available from Sigma-Aldrich.
PPG-MA is poly(propylene glycol) monoacrylate having a Mn of 375 available from Sigma-Aldrich.
PETTEGE-DA is a pentaerythritol tetrakis(tetraethylene glycol ether) diacrylate having following structure:

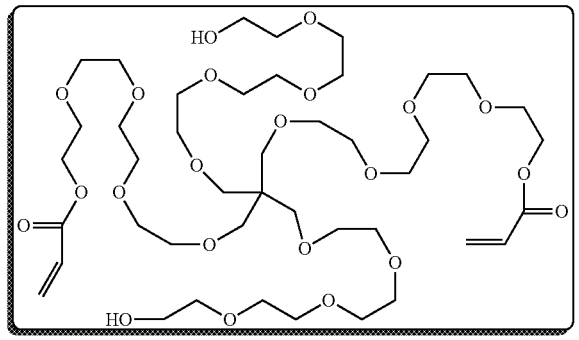

The PETTEGE-DA was prepared by the following steps. In a 500 ml 3-neck flask, weighed in 79.7 g (0.1 mol) pentaerythritol ethoxylate 15/4 (EO/OH) available from Sigma-Aldrich and then dried in vacuum and aerated with dry nitrogen. 200 ml dichloromethane and 21.3 g (0.21 mol) triethylamine available from Sigma-Aldrich were added and mixture were stirred and cooled down to down to 0° C. in ice bath. 18.1 g (0.2 mol) acryloylchloride available from Sigma-Aldrich were added dropwise and mixture were stirred for 30 min at 0° C. and 30 min at room temperature. The precipitate was then obtained by filtration and washing. The final product has a molecule weight of about 973. The yield is 41.1%.

Various exfoliating agents have been prepared according to the formulations in Table 1. 2% by mass of a pristine hectorite was mixed with each exfoliating agent at room temperature in 2 hours. No additional homogenization was applied. Then the samples were visually detected for the state of osmotic swelling and exfoliation according to the following criterial:

1. If the disintegration of the chunks of crude hectorite was observed,
2. If a significant viscosity increase was observed,
3. If a pearlescence effect due to interference of light was observed, and
4. If a homogeneous suspension was observed.

In the visual test, the samples were evaluated as "Passed" or "P" only when all of the states were observed. The samples were evaluated as "Failed" or "F" if any of the criterial was not observed. The test results are shown in Table 1.

In the test results of Table 1, it is evident that all inventive examples (Ex. 1 to Ex. 9) exhibited excellent osmotic swelling and fully or almost fully exfoliation of the hectorite. However, poor exfoliation performance was observed in comparative examples (CEx.) 1, 6, 7 and 9 using exfoliating agents containing no partial ester of poly(alkylene oxide) (meth)acrylate, cyclic carbonates and/or water, in CExs. 2 to 5 using an exfoliating agent containing polyether amines or polyether polyols instead of partial ester of poly(alkylene oxide) (meth)acrylates, and in CEx. 8 using an exfoliating agent containing a significant amount of water.

Furthermore, the clay suspensions were further tested by SAXS (Small Angle X-ray Scattering). The measurement was conducted by using a "Double Ganesha AIR" tester manufactured by SAXSLAB, Denmark. In the tests, X-Rays were generated by a rotating copper anode (MicoMax 007HF, Rigaku Corporation, Japan) yielding to a microfocused beam. A position sensitive detector (PILATUS 300K, Dectris) was used in different positions to cover the range of the scattering vector $q=0.001\text{-}1 \text{ Å}^{-1}$. Prior to the measurement, each clay suspension was filled in 1 mm glass capillaries (Hilgenberg, code 4007610). The circularly averaged data were normalized to incident beam, sample thickness and measurement time.

Figure 2:
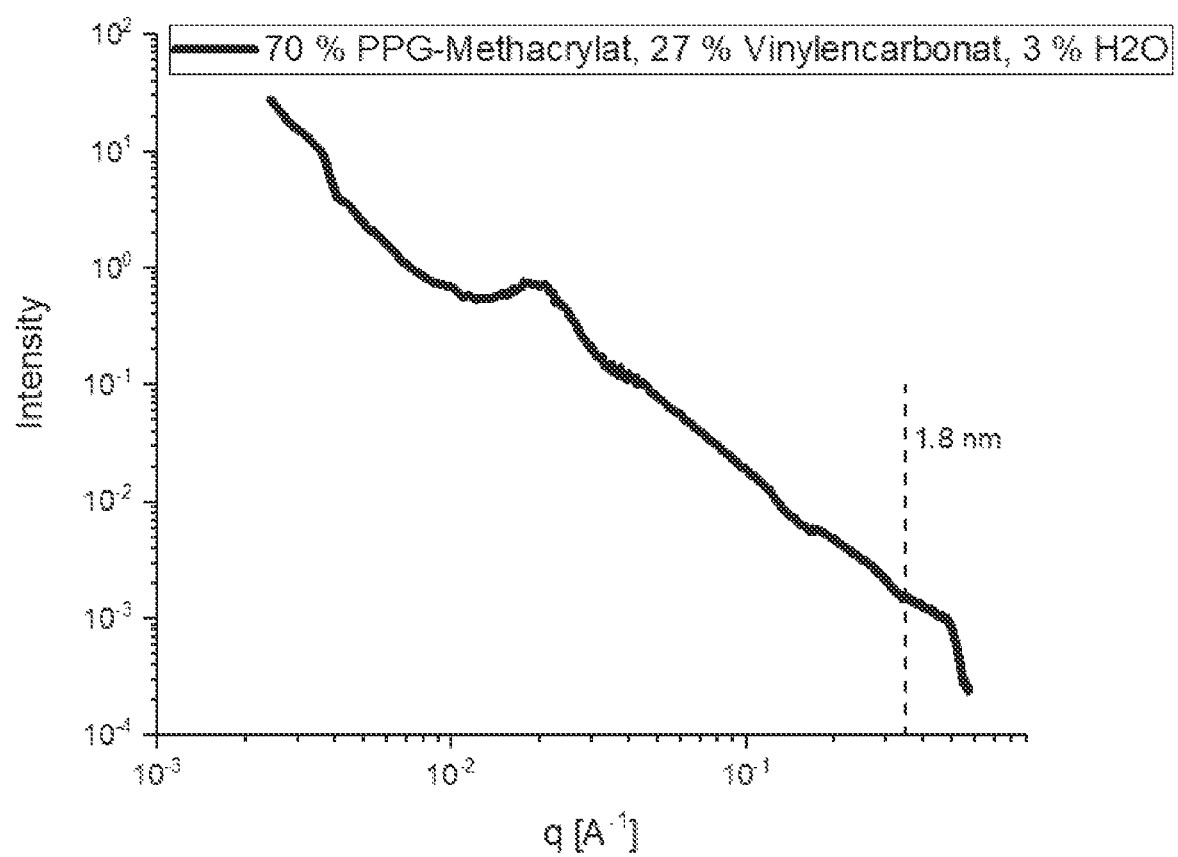
FIG. 2 shows the results of SAXS (Small Angle X-ray Scattering) measurement on the sample based on Example 3.
Figure 3:
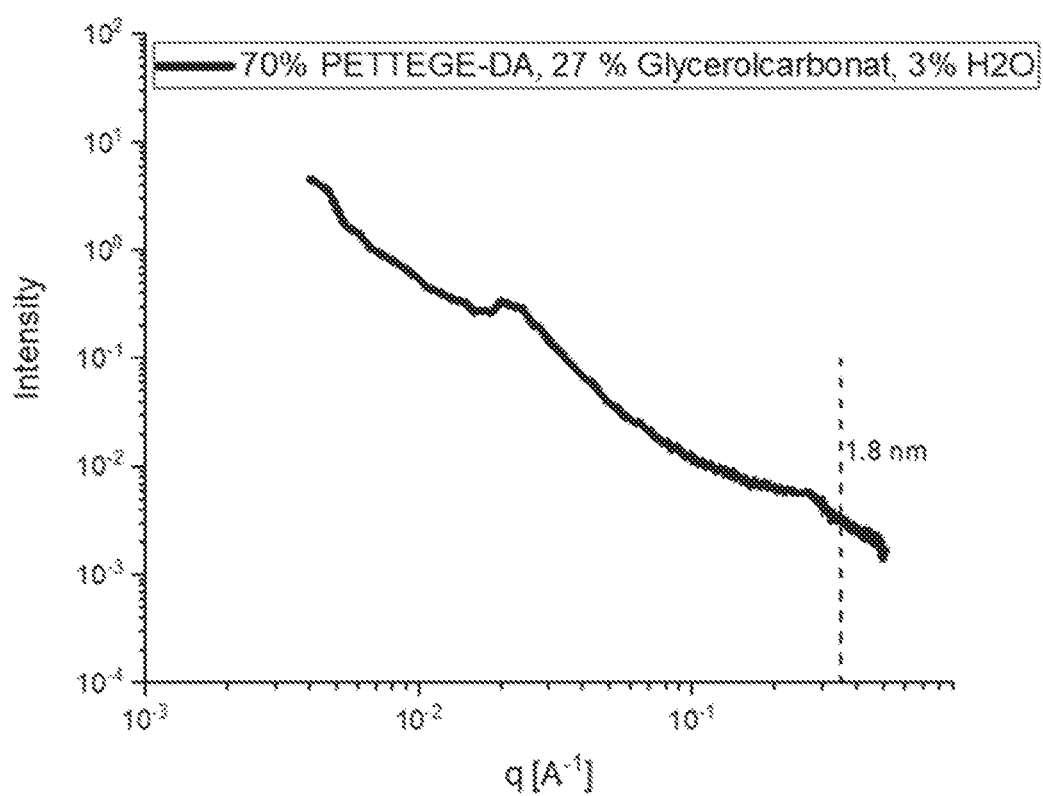
FIG. 3 shows the results of SAXS (Small Angle X-ray Scattering) measurement on the sample based on Example 5.
Figure 4:
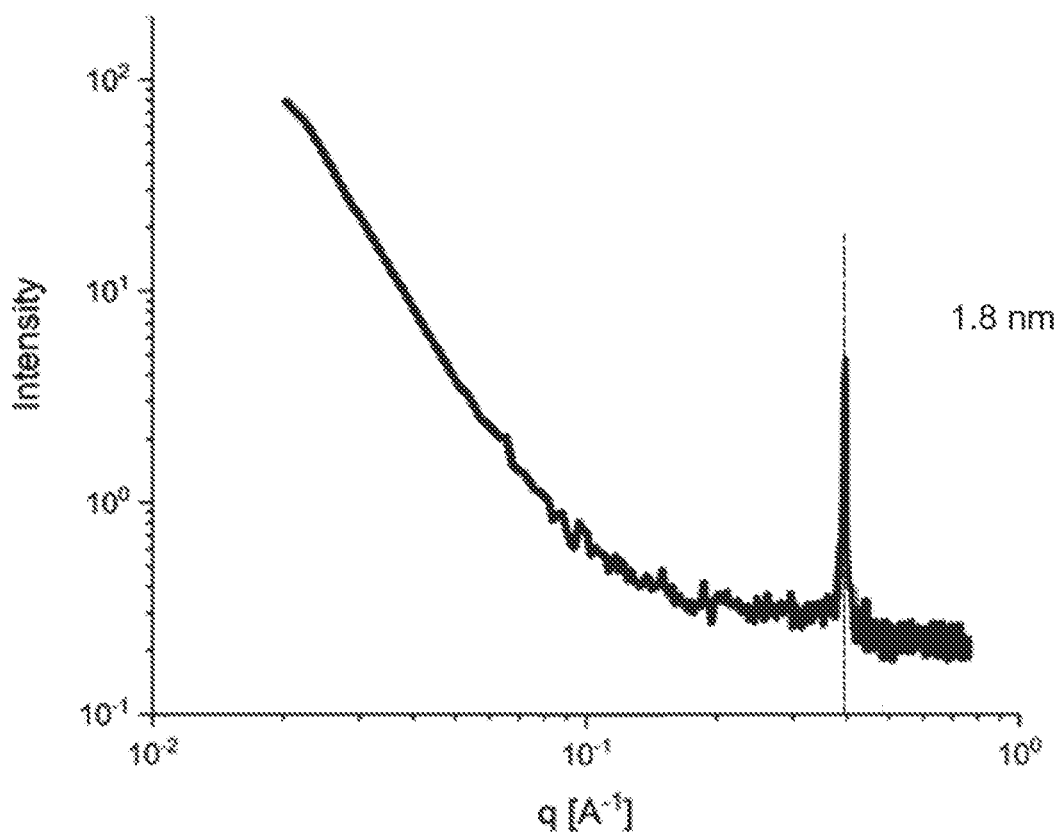
FIG. 4 shows the results of SAXS (Small Angle X-ray Scattering) measurement on the sample based on Comparative Example 4.

The inter-layer distance of the platelets of the phyllosilicate thus could be determined. In each of FIGS. 1 to 3 showing the test results of Examples 4, 3 and 5, respectively, the peak representing the initial layer distance of the pristine hectorite (non-exfoliated) or aggregated platelets of hectorite of 1.8 nm (see dotted lines), has completely or almost completely disappeared. A typical example (CEx. 4) was shown in FIG. 4 that in case the sample was not exfoliated, a pronounced peak would be visible at 1.8 nm (see dotted lines).

In addition, the exfoliated hectorite suspensions according to the inventive examples contains organic matrix having hydroxy groups and no significant amount of water. When such hectorite suspensions were used in polyurethane based adhesive formulations, such formulations could achieve excellent adhesion and gas barrier properties. This is, in particular, important in case of laminating adhesives used for flexible packaging.

TABLE 1

Formulations of exfoliating agents (% by volume) and test results of samples.

| Component | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| PEG-MA | 70 | | | | | | | | |
| PPG-MA | | | 70 | | | | | | |
| PPG-A | | 70 | | 70 | | 70 | 60 | | |
| PETTEGE-DA | | | | | 70 | | | 60 | 70 |
| VC | 27 | 27 | 27 | | | 25 | 37 | | 27 |
| GC | | | | 27 | 27 | | | 37 | |
| Water | 3 | 3 | 3 | 3 | 3 | 5 | 3 | 3 | 3 |
| Visual test | P | P | P | P | P | P | P | P | P |

| Component | CEx. 1 | CEx. 2 | CEx. 3 | CEx. 4 | CEx. 5 | CEx. 6 | CEx. 7 | CEx. 8 | CEx. 9 |
|---|---|---|---|---|---|---|---|---|---|
| PEG-MA | | | | | | | 97 | 70 | 100 |
| PETTEGE-DA | | | | | | | | 40 | |
| Jeffamine M-600 | | 70 | | | | | | | |
| Jeffamine M-2070 | | | 70 | | | | | | |
| PPG-triol | | | | 70 | 70 | | | | |
| VC | 97 | 27 | 27 | | 15 | | 30 | | |
| GC | | | | 27 | | | | 30 | |
| Water | 3 | 3 | 3 | 3 | 15 | 3 | | 30 | |
| Visual test | F | F | F | F | F | F | F | F | F |

The invention claimed is:

1. A method for preparing an at least partially exfoliated clay, the method comprising:
   providing a clay;
   providing an exfoliating agent comprising a partial ester of a poly(alkylene oxide) (meth)acrylate, vinylene carbonate, and water; and
   mixing the clay and the exfoliating agent to obtain the at least partially exfoliated clay,
   wherein the water is present in an amount of 10% or less by volume, based on the total volume of the exfoliating agent.

2. The method of claim 1, wherein the water is present in an amount of from 0.1% to 10% by volume, based on the total volume of the exfoliating agent.

3. The method of claim 1, wherein the partial ester of the poly(alkylene oxide) (meth)acrylate is present in an amount of from 30 to 90% by volume, based on the total volume of the exfoliating agent.

4. The method of claim 1, wherein the vinylene carbonate is present in an amount of from 5 to 60% by volume, based on the total volume of the exfoliating agent.

5. The method of claim 2, wherein the water is present in an amount of from 0.1% to 5% by volume, based on the total volume of the exfoliating agent.

6. The method of claim 5, wherein the water is present in an amount of 0.5% to 3% by volume, based on the total volume of the exfoliating agent.

7. The method of claim 1, wherein the clay is selected from the group consisting of hectorite and fluorohectorite.

8. The method of claim 7, wherein the clay is hectorite.

* * * * *